(12) United States Patent
Ratner

(10) Patent No.: US 10,899,322 B2
(45) Date of Patent: Jan. 26, 2021

(54) SYSTEMS AND METHODS FOR RAPIDLY DECELERATING A VEHICLE

(71) Applicant: Nuro, Inc., Mountain View, CA (US)

(72) Inventor: Daniel Jason Ratner, San Francisco, CA (US)

(73) Assignee: Nuro, Inc., Mountain View, CA (US)

( * ) Notice: Subject to any disclaimer, the term of this patent is extended or adjusted under 35 U.S.C. 154(b) by 0 days.

(21) Appl. No.: 16/509,645

(22) Filed: Jul. 12, 2019

(65) Prior Publication Data
US 2020/0139943 A1 May 7, 2020

Related U.S. Application Data

(63) Continuation of application No. 16/179,007, filed on Nov. 2, 2018, now Pat. No. 10,369,976.

(51) Int. Cl.
*B60T 1/14* (2006.01)
*B60T 7/12* (2006.01)
*B60W 30/09* (2012.01)
*G05D 1/00* (2006.01)
*G08G 1/16* (2006.01)

(52) U.S. Cl.
CPC ............... *B60T 1/14* (2013.01); *B60T 7/12* (2013.01); *B60W 30/09* (2013.01); *G05D 1/0088* (2013.01); *G08G 1/166* (2013.01); *B60T 2201/03* (2013.01); *B60W 2554/00* (2020.02)

(58) Field of Classification Search
CPC .......... B60T 7/12; B60T 1/14; B60T 2201/03; B60W 30/09; G05D 1/0088; G05D 3/206; G08G 1/166
See application file for complete search history.

(56) References Cited

U.S. PATENT DOCUMENTS

| 4,066,151 A | * | 1/1978 | Liebscher | ................. B60T 1/14 188/167 |
| 4,265,338 A | * | 5/1981 | Shea | ........................ B60T 1/14 188/4 R |
| 4,317,507 A | * | 3/1982 | McMillan | ................. B60T 1/14 188/2 R |
| 5,439,076 A | * | 8/1995 | Percy, Jr. | .................. B60T 1/14 188/4 R |

(Continued)

FOREIGN PATENT DOCUMENTS

| DE | 3437402 | * | 4/1986 |
| DE | 3437402 A1 | | 4/1986 |

(Continued)

OTHER PUBLICATIONS

International Search Report and the Written Opnion of the International Searching Authority, dated Oct. 10, 2018, corresponding to International No. PCT/US2018/044361; 12 total pages.

(Continued)

*Primary Examiner* — Vishal R Sahni

(57) ABSTRACT

A system for decelerating a vehicle includes a powered driver and an anchor supported by the powered driver. The powered driver configured to be movably coupled to a chassis of the vehicle. The powered driver is also configured to propel the anchor from the powered driver into a road surface to secure the vehicle to the road surface for decelerating the vehicle.

23 Claims, 10 Drawing Sheets

(56) References Cited

U.S. PATENT DOCUMENTS

| | | | | |
|---|---|---|---|---|
| 5,444,949 | A * | 8/1995 | Ciaccio | B60T 3/00 |
| | | | | 188/32 |
| 9,487,190 | B1 * | 11/2016 | Alvarado | B60T 1/14 |
| 10,369,976 | B1 | 8/2019 | Ratner | |
| 2008/0136133 | A1 * | 6/2008 | Takahashi | A45C 5/145 |
| | | | | 280/79.2 |
| 2010/0084426 | A1 | 4/2010 | Devers et al. | |
| 2011/0017538 | A1 | 1/2011 | Baumann | |
| 2011/0155496 | A1 | 6/2011 | Baumann | |
| 2011/0198161 | A1 * | 8/2011 | Lomazzo | B60T 1/14 |
| | | | | 188/5 |
| 2013/0037355 | A1 * | 2/2013 | Baker | B60T 1/14 |
| | | | | 188/5 |
| 2014/0081445 | A1 | 3/2014 | Villamar | |
| 2014/0191078 | A1 | 7/2014 | Boren | |
| 2015/0006005 | A1 | 1/2015 | Yu et al. | |
| 2017/0101095 | A1 | 4/2017 | Nilsson | |
| 2017/0174343 | A1 | 6/2017 | Erickson et al. | |
| 2019/0263365 | A1 * | 8/2019 | Krasnoff | F16D 63/008 |

FOREIGN PATENT DOCUMENTS

| | | |
|---|---|---|
| DE | 102005009949 A1 | 9/2006 |
| WO | 2017117303 A1 | 7/2017 |

OTHER PUBLICATIONS

International Search Report and Written Opinion in counterpart International Application No. PCT/US2019/058808, dated Apr. 22, 2020, 15 pages.

* cited by examiner

SYSTEMS AND METHODS FOR RAPIDLY DECELERATING A VEHICLE

CROSS-REFERENCE TO RELATED APPLICATION

This application is a continuation application of U.S. patent application Ser. No. 16/179,007, filed on Nov. 2, 2018, the entire contents of which are incorporated by reference herein.

BACKGROUND

The present application relates to autonomous vehicles, and in particular, to systems and methods for rapidly decelerating an autonomous vehicle.

The field of fully-autonomous and/or semi-autonomous robots is a growing field of innovation. Robots are being used for many purposes including warehouse inventory operations, household vacuuming robots, hospital delivery robots, sanitation robots, and military or defense applications.

In the consumer space, handling and delivery of items by autonomous vehicles could improve society in many ways. For example, rather than spending time driving to a store, a person can instead engage in productive work while waiting for an autonomous vehicle to deliver the items. With fewer vehicles on the road, traffic conditions would also improve. For example, instead of several people driving to stores in several vehicles, a single autonomous vehicle could deliver items to those people and return items to the stores, and thereby reduce the number of vehicles on the road.

In some instances, a pedestrian or other object may enter an immediate path of an autonomous vehicle moving at high speeds (e.g., above about 30 mph). In such instances, it would be advantageous for the vehicle to be capable of stopping or otherwise avoiding the object. Since autonomous vehicles are unmanned, avoidance of the pedestrian or other object may be accomplished without care for the well-being of the vehicle or occupants.

SUMMARY

As used herein, the terms parallel and perpendicular are understood to include relative configurations that are substantially parallel and substantially perpendicular up to about +/−10 degrees from true parallel and true perpendicular.

As used herein, the term "autonomous" includes fully-autonomous, semi-autonomous, and any configuration in which a vehicle can travel in a controlled manner for a period of time without human intervention.

As used herein, the term "robot," "robot vehicle," "robot fleet," "vehicle," "all-terrain vehicle," and like terms are used to indicate a mobile machine that transports cargo, items, and/or goods. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, "road surface" includes, for example, asphalt, concrete, brick, stone, dirt, wood, metal, etc., and can include, for instance, highways, paths, driveways, walkways, back roads, bridges, paths, tunnels, parking lots, ramps, garages, etc.

Provided in accordance with aspects of the present disclosure is a system for decelerating a vehicle including a mount and a powered driver. The mount has a first end portion configured to be coupled to a chassis of a vehicle. The powered driver is coupled to a second end portion of the mount and supports an anchor. The powered driver is configured to propel the anchor toward a road surface to selectively secure the vehicle to the road surface.

In aspects, the mount may include a first strap that couples the powered driver to the chassis of the vehicle. The first strap may be configured to maintain the anchor secured to the chassis of the vehicle when the anchor is propelled by the powered driver.

In some aspects, the mount may include an axle secured to the powered driver.

In further aspects, the mount may include a second strap coupled to the axle.

In other aspects, the mount may include a first plate coupled to the first strap and the second strap, and a first damper captured between the first plate and the second strap to limit relative movement between the first plate and the second strap.

In aspects, the first damper may be configured to compress between a stop of the first plate and a first end portion of the second strap.

In some aspects, the mount may include a second plate coupled to the second strap, and a second damper captured between the first plate and the second plate. The first strap may be wrapped around the second damper.

In further aspects, the second damper may be configured to compress between a stop of the first plate and a stop of the second plate.

In other aspects, the system may further include an axle coupled to the powered driver. The axle may be configured to be coupled to the chassis and selectively detachable therefrom.

In aspects, the powered driver may include a body having a fastener protruding therefrom. The fastener may be configured to engage the road surface upon the axle detaching from the chassis.

In some aspects, the system may further include a linkage having a first end portion configured to be pivotably coupled to the chassis and axially restrained thereto, and a second end portion pivotably coupled to the axle.

In further aspects, the linkage may be biased toward a deployed state, such that upon detaching the axle from the chassis, the linkage is configured to move the axle away from the chassis toward the road surface to engage the fastener of the powered driver with the road surface.

In other aspects, the linkage may be spring biased toward the deployed state.

In aspects, the system may further include another powered driver disposed along a length of the axle.

In some aspects, the powered driver may include a body, a fastener extending from a bottom portion of the body, an anchor deployable from the body, and an actuator configured to deploy the anchor from the body.

Provided in accordance with aspects of the present disclosure is an autonomous vehicle including a chassis and a system for decelerating the chassis along a road surface. The system includes a mount having a first end portion coupled to the chassis, and a powered driver coupled to a second end portion of the mount. The powered driver is configured to propel an anchor therefrom to limit movement of the chassis relative to the road surface.

In aspects, the mount may include an axle having the powered driver fixed thereto, and a first strap having a first end portion wrapped about a transverse bar of the chassis, and a second end portion coupled to the axle.

In some aspects, the mount may include a second strap having a first end portion disposed adjacent the second end portion of the first strap, and a second end portion wrapped about the axle. The first strap may be configured to move with the chassis and away from the second strap.

In further aspects, the mount may include a damper disposed between the transverse bar of the chassis and the axle. The first strap and/or the second strap may be configured to compress the damper as the first strap moves away from the second strap.

In other aspects, the mount may include a first plate and a first damper. The first plate may be slidably disposed between the transverse bar of the chassis and the axle and coupled to the first strap. The first damper may be captured between the first plate and the second strap. The first strap may be configured to advance the first plate upon moving away from the second strap, whereby the first damper inhibits without preventing the advancement of the first plate.

In aspects, the axle may be coupled to the chassis and selectively detachable therefrom.

In some aspects, the powered driver may include a body having a fastener protruding therefrom. The fastener may be configured to engage the road surface upon the axle detaching from the chassis.

In further aspects, the vehicle may further include a linkage having a first end portion pivotably coupled to the chassis and axially restrained thereto, and a second end portion pivotably coupled to the axle.

In other aspects, the linkage may be pivotable relative to the chassis from a stored position, in which the second end portion of the linkage maintains the powered driver in a retracted state, to a deployed position, in which the second end portion of the linkage positions the powered driver adjacent the road surface.

In aspects, the linkage may be biased toward the deployed state, such that upon detaching the axle from the chassis, the linkage is configured to move the axle away from the chassis toward the road surface to engage the fastener of the powered driver with the road surface.

In accordance with further aspects of the present disclosure, a method of decelerating a vehicle is provided and includes sensing an object to be avoided on a road surface, and propelling an anchor from a powered driver of the vehicle toward the road surface to limit movement of the vehicle relative to the road surface.

Some methods may further include moving the powered driver from a retracted state within the chassis to a deployed state to engage a fastener of the powered driver with the road surface. The anchor may be propelled while the fastener of the powered driver is engaged with the road surface In some methods, the powered driver may be attached to an axle that is selectively attached to the chassis. Moving the powered driver to the deployed state may include detaching the axle from the chassis.

In some methods, the axle may be coupled to a linkage that is pivotably coupled to the chassis. Moving the powered driver to the deployed state may include pivoting the linkage relative to the chassis after the axle is detached from the chassis.

Some methods may further include moving the chassis away from the powered driver, thereby axially extending a mount that couples the chassis and the powered driver together.

Some methods may further include compressing a damper of the mount between the chassis and the powered driver after fixing the anchor in the road surface.

BRIEF DESCRIPTION OF THE DRAWINGS

Various aspects and features of the present disclosure are described hereinbelow with reference to the drawings wherein like numerals designate identical or corresponding elements in each of the several views.

DETAILED DESCRIPTION

Figure 1A:
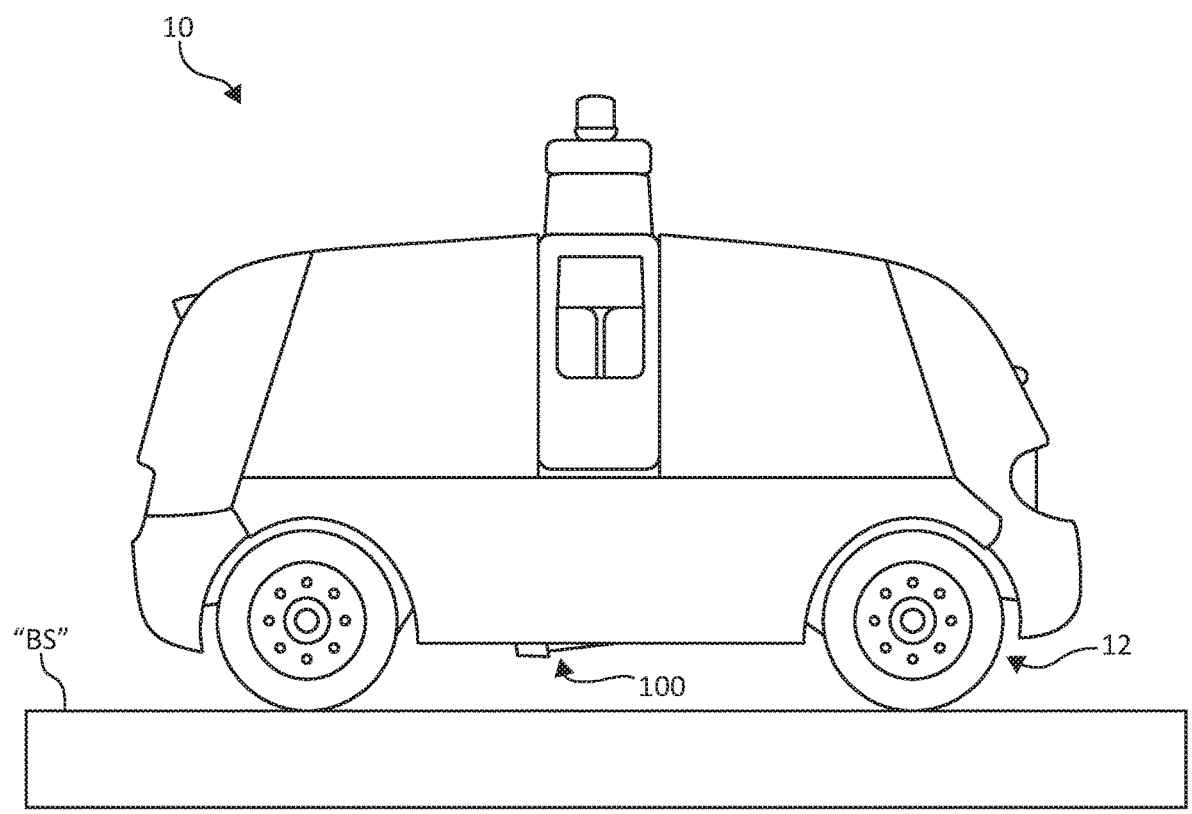
FIG. 1A is a side view of an exemplary autonomous vehicle having a deceleration system, the deceleration system shown in an undeployed state relative to a chassis of the vehicle and a road surface in accordance with aspects of the present disclosure.
Figure 1B:
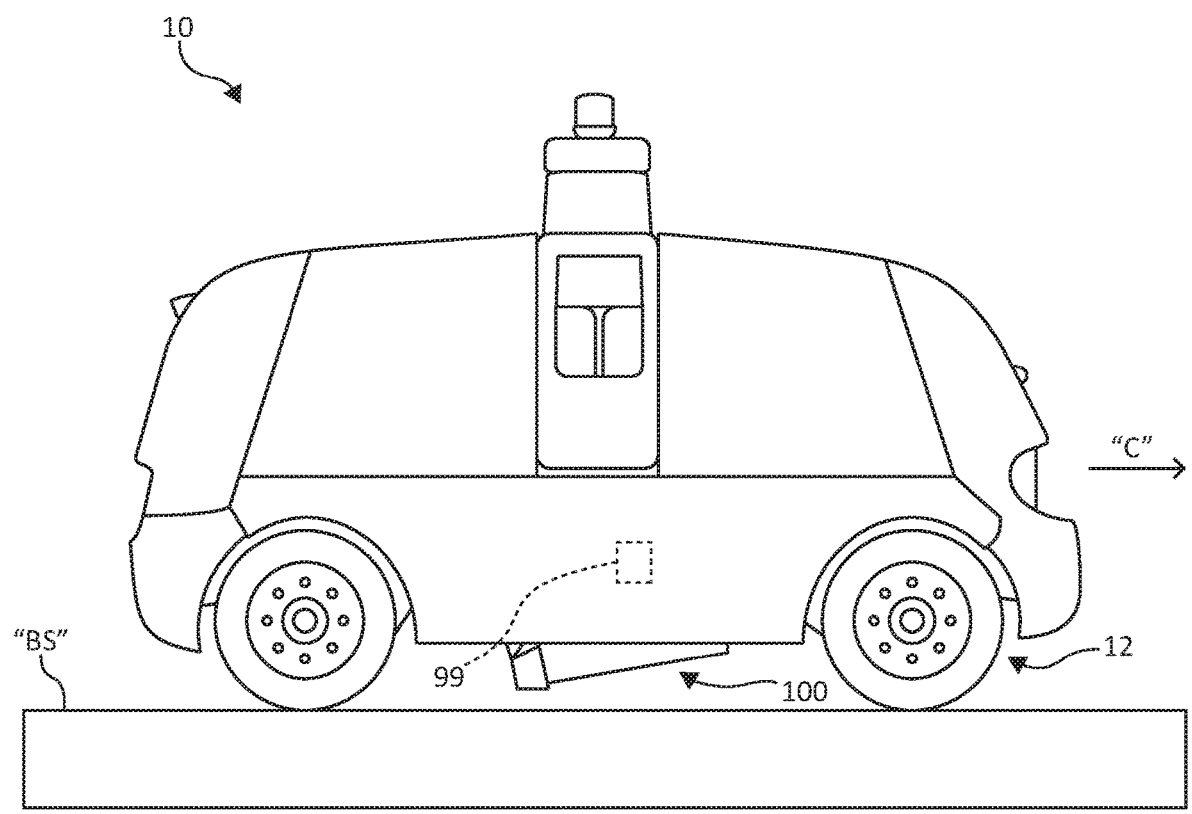
FIG. 1B is a side view of the autonomous vehicle of FIG. 1A with the deceleration system shown in a deployed state relative to the chassis of the vehicle and the road surface in accordance with aspects of the present disclosure.
Figure 2:
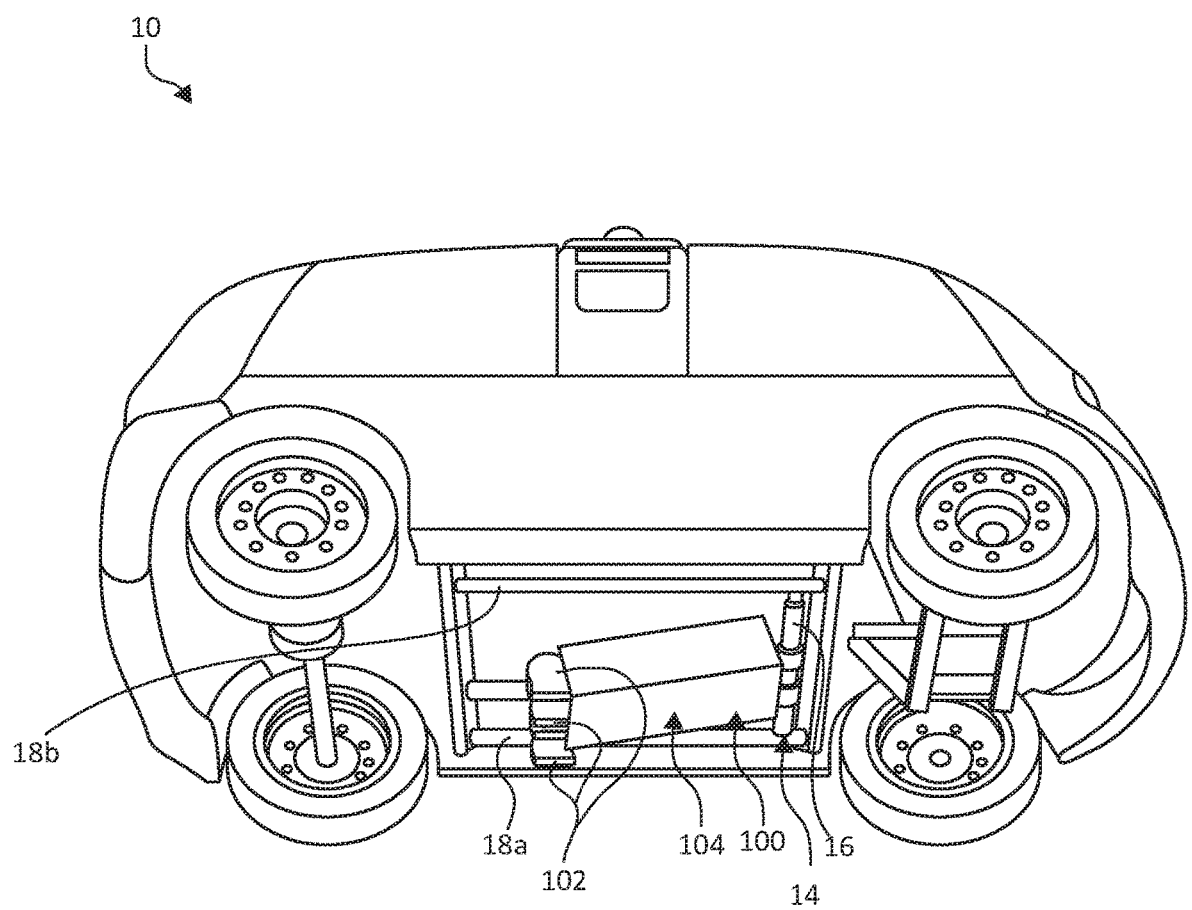
FIG. 2 is a bottom perspective view of the autonomous vehicle as shown in FIG. 1B.

Referring to FIGS. 1A-2, the deceleration systems 100 of the present disclosure are incorporated into a vehicle configured for land travel, such as a small, fully-autonomous (or semi-autonomous) vehicle 10 shown in FIGS. 1A-2. The deceleration system 100 is movable between an undeployed state (FIG. 1A) and a deployed state (FIG. 1B) to selectively limit movement of the vehicle 10 relative to a road surface "RS" (e.g., for rapid stopping, turning, etc.) In other aspects, the deceleration systems 100 may be incorporated into any suitable land vehicle or other moving object requiring rapid deceleration.

The exemplary fully-autonomous (or semi-autonomous) vehicle 10, shown in FIGS. 1A-2, is narrow (e.g., 2-5 feet wide), has low mass and low center of gravity for stability, has multiple selectively securable compartments assignable to one or more customers, retailers and/or vendors, and is designed for moderate working speed ranges (e.g., up to 45.0 mph) to accommodate inner-city and residential driving speeds. Additionally, in some embodiments, the land vehicle 10 is configured with a maximum speed range up to about 90.0 mph for high speed, intrastate or interstate driving. The vehicle 10 is equipped with onboard sensors (not explicitly shown), e.g., cameras (running at a high frame rate, akin to video), LiDAR, radar, ultrasonic sensors, microphones, etc., and internal computer processing to constantly determine where it can safely navigate, what other objects are around the vehicle 10 and what it may do. In some embodiments, the vehicle 10 is fully-autonomous or semi-autonomous.

The vehicle 10 includes a conveyance system 12 (e.g., a drive system with a propulsion engine, wheels, treads, wings, rotors, blowers, rockets, propellers, brakes, etc.). The vehicle 10 is configured with a traditional 4-wheeled automotive configuration including conventional steering and braking systems, although vehicle may be provided with any number of wheels, axles, etc. The drive train is configurable for standard 2-wheel drive or 4-wheel all-terrain traction drive, but may be modified to include any suitable drive system. The propulsion system (engine) is configurable as a gas engine, a turbine engine, an electric motor and/or a hybrid gas/electric engine. In some embodiments, the vehicle 10 is configured with an auxiliary solar power system to provide back-up emergency power or power for minor low-power sub-systems. Alternative configurations of components to a total drive system with a propulsion engine could include wheels, treads, wings, rotors, blowers, rockets, propellers, brakes, etc. For a more detailed description of structure and operation of the vehicle 10 and/or its use in connection with a fleet of vehicles, reference can be made to International Application No. PCT/US2018/044361, filed on Jul. 30, 2018, or U.S. patent application Ser. No. 16/159,016, filed Oct. 12, 2018, the entire contents of each of which are incorporated by reference herein.

With reference to FIGS. 2-5, the deceleration system 100 provided in accordance with the present disclosure may be incorporated into a vehicle, such as, for example, the autonomous vehicle 10 briefly described above. In some embodiments, deceleration system 100 can be provided in a kit or independent form for separate attachment to a chassis 14 of a vehicle 10, while in other embodiments, deceleration system 100 may be integrally formed with a chassis 14 of vehicle 10. It is contemplated that the deceleration system 100 may be incorporated into any suitable land vehicle or other moving object that would benefit from the added ability of rapid deceleration. The deceleration system 100 generally includes powered drivers 102 for selectively deploying one or more anchors 128 (FIG. 6B) into the road surface "RS" (FIGS. 1A and 1B), and a mount 104 for holding the powered drivers 102 and, in turn, the anchors 128, to a chassis 14 of the vehicle 10 after having deployed one or more of the anchors 128 into the road surface "RS."

The deceleration system 100 has an axle 106 for supporting the powered drivers 102 and coupling the powered drivers 102 to the chassis 14 of the vehicle 10. The axle 106 may have any number of powered drivers 102 fixed thereto along its length. For instance, while four powered drivers 102 are shown attached along the length of the axle 106, it is contemplated that more or less than four powered drivers 102 may be provided. The axle 106 is longitudinally spaced from a transverse bar 16 of the chassis 14 and is parallel therewith. The axle 106 has opposing ends 106a, 106b configured to be detachably coupled to a pair of longitudinal bars 18a, 18b of the chassis 14. In particular, the chassis 14 of the vehicle 10 may have a first coupler 20a secured to the first longitudinal bar 18a, and a second coupler 20b secured to the second longitudinal bar 18b. The ends 106a, 106b of the axle 106 define openings 108 therein configured to receive protrusions 22 extending from the first and second couplers 20a, 20b. In embodiments, the ends 106a, 106b of the axle 106 may be detachably coupled to the longitudinal bars 18a, 18b via any suitable fastening techniques or engagements, such as, for example, welding, crimping, adhesion, friction fit, straps, latches, buttons, fasteners, bayonet-type connections and the like, or combinations thereof.

The deceleration system 100 includes a release mechanism 109 for selectively detaching the axle 106 and, in turn, the powered drivers 102, from the chassis 14. For example, the release mechanism 109 may include a detonator control box 110 in electric communication (e.g., via wires or wireless) with a controller 99 of vehicle 10 (see FIG. 1B) and the first and second couplers 20a, 20b of the chassis 14.

The first and second couplers 20a, 20b support explosive material (e.g., chemical energy such as nitroglycerin or grain dues, pressurized gas such as gas cylinder or aerosol can, and/or nuclear energy such as fissile isotope uranium-235 and plutonium-239) that can be selectively activated by controller 99 (by an electrical signal transmitted from controller 99 to detonator control box 110) to release sufficient explosive energy to detach axle 106 from first and second couplers 20a, 20b without damaging vehicle 10 or deceleration system 100. More specifically, to break the connection between the axle 106 of the deceleration system 100 and the chassis 14, a processor in the control box 110 sends a signal to the explosives in the first and second couplers 20a, 20b to detonate, thereby breaking the bond between the ends 106a, 106b of the axle 106 and the first and second couplers 20a, 20b of the chassis 14. Release mechanisms other than the aforementioned explosive-type may be employed for detaching the axle 106 from the chassis 14, such as, for example, a solenoid lock, a mechanical spring lock, a magnetic lock, or any other suitable mechanical and/or electromechanical locking devices. For instance, a fastener (e.g., tether) securing to axle 106 to chassis 14 may be selectively broken or severed by a release mechanism (e.g., a movable knife) configured to sever the fastener to release the axle 106 from the chassis 14.

Figure 3:
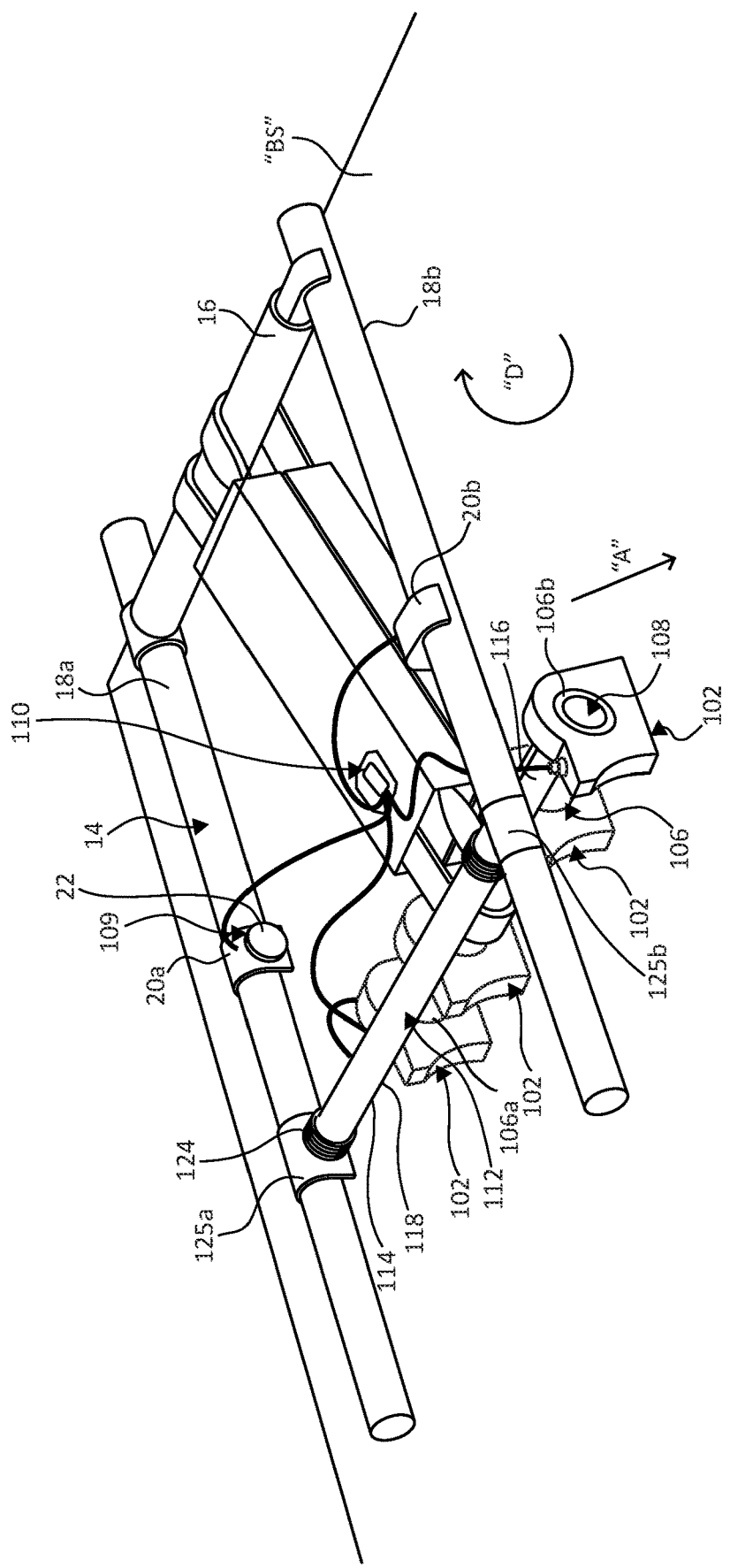
FIG. 3 is a top perspective view illustrating the deceleration system in the deployed state relative to the chassis of the vehicle and the road surface.
Figure 4:
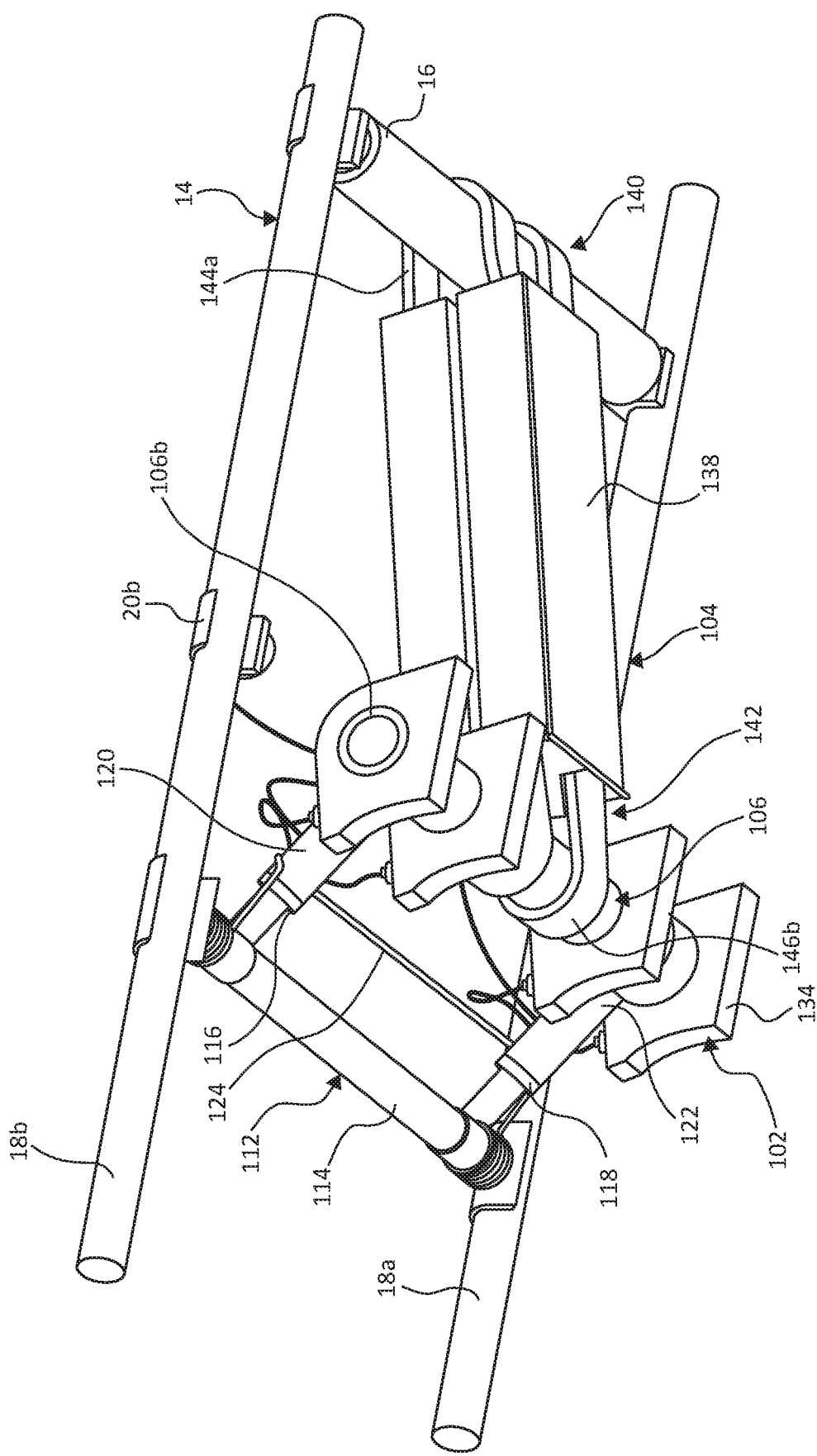
FIG. 4 is a bottom perspective view illustrating the deceleration system of FIG. 3 in the deployed state.
Figure 5:
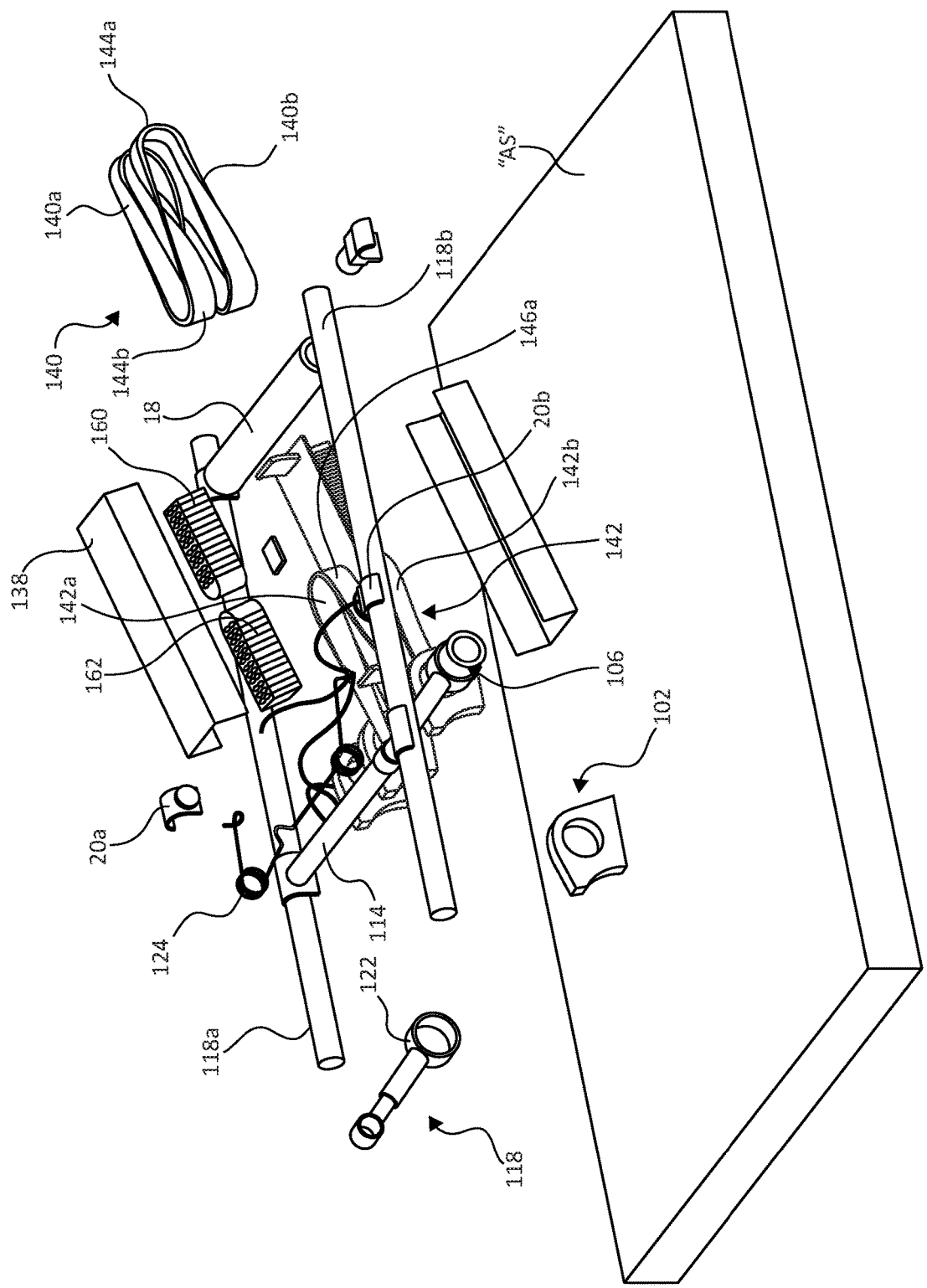
FIG. 5 is a perspective view, with parts separated, of portions of the deceleration system of FIGS. 3 and 4 shown in relation to the road surface.

The deceleration system 100 may include a linkage assembly 112 attached to the opposing longitudinal bars 18a, 18b of the chassis 14 and operably coupled to the axle 106. When the axle 106 is released from the chassis 14, for example, by actuation of one or more of the release mechanisms described above, the linkage assembly 112 is configured to forcefully drive the axle 106 downward, in the direction indicated by arrow "A" in FIG. 3, toward the road surface "RS" and maintain the axle 106 and the powered drivers 102 in forceful engagement with the road surface "RS." The linkage assembly 112 has a transverse rod 114 having opposing ends rotatably coupled to the respective longitudinal bars 18a, 18b of the chassis 14 while also being axially restrained to the longitudinal bars 18a, 18b. More specifically, the linkage 114 is rotatable relative to the chassis 14 while being prevented from moving axially in the longitudinal direction along the longitudinal bars 18a, 18b of the chassis 14 by attachment members 125a, 125b (FIG. 3). The linkage assembly 112 further includes a pair of first and second arms 116, 118 extending from the respective opposing end portions of the transverse rod 114. The arms 116, 118 of the linkage 114 each have end portions 120, 122 pivotably coupled to the opposing ends 106a, 106b of the axle 106. The arms 116, 118 are constructed from two or more spring-biased, telescoping columns configured to adjust a length of the arms 116, 118. It is contemplated that the arms 116, 118 may be shock absorbers and/or may include other suitable dampers such as springs.

The linkage assembly 112 may be configured to bias the axle 106, along with the powered drivers 102, toward the deployed state (e.g., away from the chassis 14 and toward the road surface "RS"). For example, the linkage assembly 112 may have a biasing element 124, such as, for example, a double torsion spring that resiliently biases the arms 116, 118 of the linkage assembly 112 away from the chassis 14 and toward the road surface "RS." In embodiments, other mechanisms may be used for biasing the arms 116, 118 of the linkage assembly 112 away from the chassis 14 and toward the road surface, such as, pneumatics, electromagnetics, hydraulics, and/or the explosive force generated during activation of the explosives in the couplers 20a, 20b of the chassis 14.

Figure 6B:
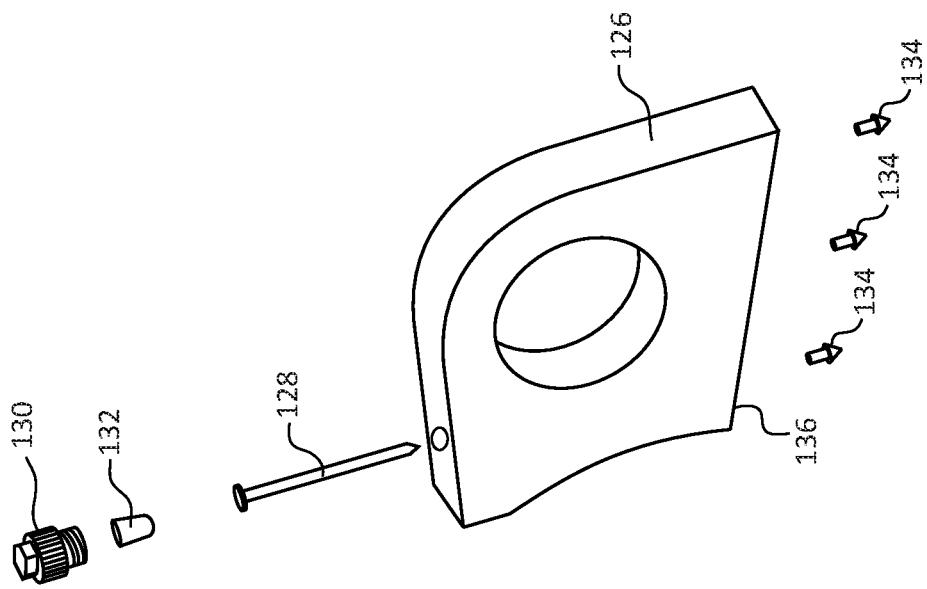
FIG. 6B is a perspective view, with parts separated, of the powered driver of FIG. 6A.
Figure 6A:
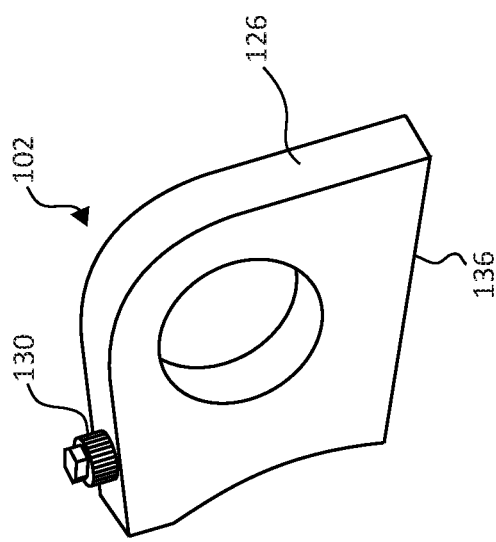
FIG. 6A is a perspective view of a powered driver of the deceleration system of FIGS. 3 and 4.

With brief reference to FIGS. 6A and 6B, the powered drivers 102 each include a body or housing 126, an anchor 128, a blast cap 130, and a cartridge 132. The anchor 128 is slidably received in the body 126 and is operably coupled to the cartridge 132. The cartridge 132 is a powder-actuated tool cartridge and is configured to deploy the anchor 128 from the body 126 into the road surface "RS" upon receiving a signal from the processor of the control box 110 (FIG. 3). In other aspects, the cartridge 132 may be pneumatically-actuated, combustion-powered, or any other suitable type of actuator. The anchor 128 may be a spike having a tapered end for penetrating a road surface such as asphalt. The head of the anchor 128 is configured to catch on an internal ledge (not shown) defined within the body 126, such that the anchor 128 remains attached to the body 126 after having been deployed. In other embodiments, the head of the anchor 128 may be tethered to the body 126.

The body 126 of the powered driver 102 has a plurality of fasteners or teeth 134 projecting from a bottom surface 136 of the body 126. The teeth 134 are configured to penetrate the road surface "RS" due to the force provided by the deployment of the axle 106 from the chassis 114. The teeth 134 fix the powered driver 102 and the axle 106 to the road surface "RS" upon impact, thereby providing zero or substantially zero relative movement between the road surface "RS" and the bottom surface 136 of the body 126 of the powered driver 102 prior to deployment of the anchor 128, as will be described.

With reference to FIGS. 3-5 and 7-9, the mount 104 of the deceleration system 100 includes a housing structure 138 and a pair of front and rear straps 140, 142 disposed within the housing structure 138. The front and rear straps 140, 142 may be closed loops each having an upper section 140a, 142a and a lower section 140b, 142b, respectively. The front and rear straps 140, 142 may be formed from any suitable material which may be elastic and/or a ductile material (e.g., polymeric material, metallic material, filaments, fabric, chain, rope, leather, cabling, wires, etc.). In embodiments, the front and rear straps 140, 142 may be fabricated from a material resistant to stretching. The front strap 140 has a front end portion 144a wrapped about a transverse bar 16 of the chassis 14 of the vehicle 10, and a rear end portion 144b disposed within the housing structure 138, and the rear strap 142 has a front end portion 146a disposed adjacent the rear end portion 144b of the front strap 140, and a rear end portion 146b wrapped about the axle 106 of the deceleration system 100.

In embodiments, the mount 104 may include any suitable structure for coupling the powered drivers 102 to the chassis 14, such as, for example, any number of tethers, fasteners, telescoping columns, or the like. In some aspects, the mount 104 may include only one strap that couples the powered drivers 102 to the transverse bar 16 of the chassis 14.

Figure 7:
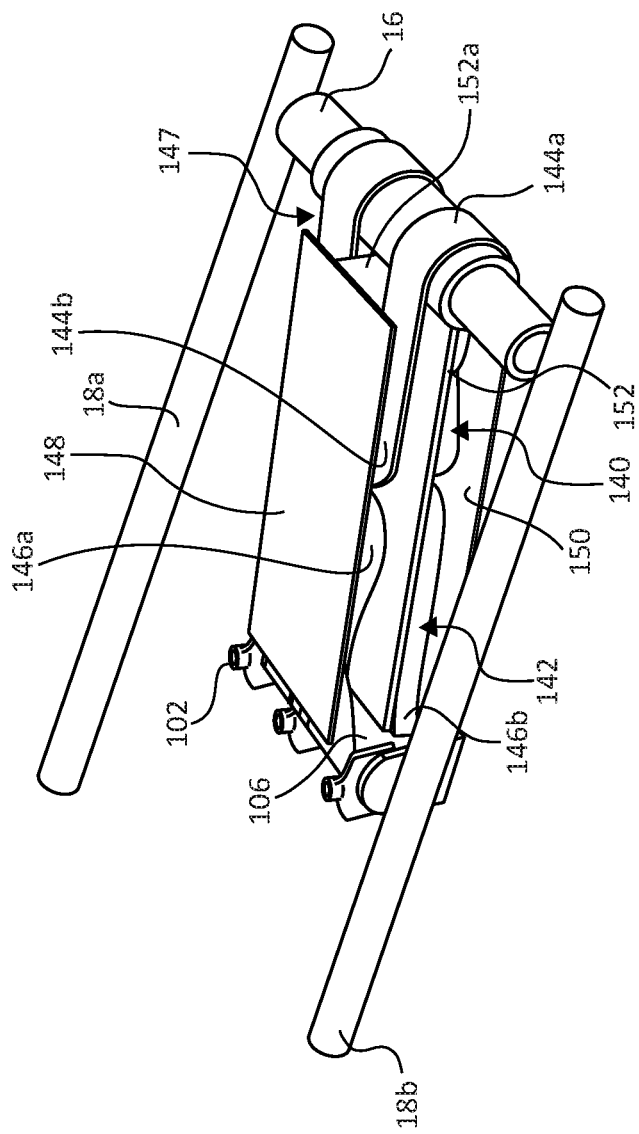
FIG. 7 is a perspective view of the deceleration system of FIGS. 3-5 with portions thereof removed for clarity.
Figure 8:
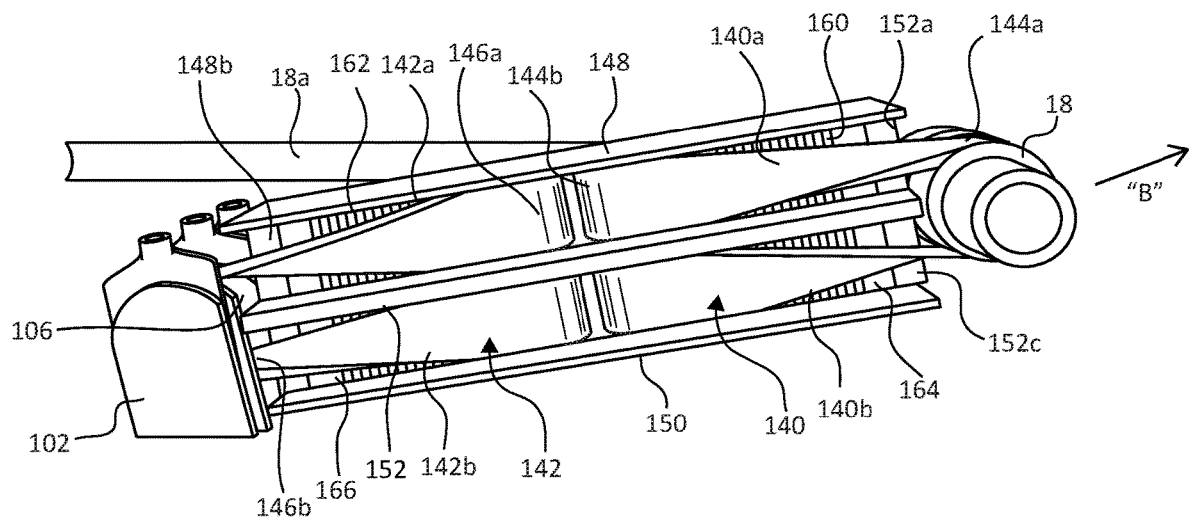
FIGS. 8 and 9 are enlarged, side views of FIG. 7 with portions thereof removed for clarity.
Figure 9:
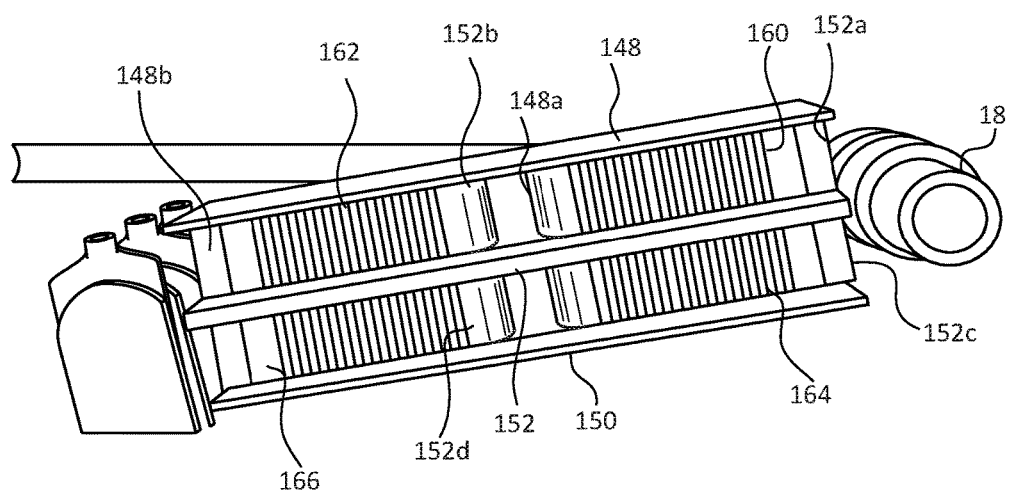

As best shown in FIGS. 7-9, the deceleration system 100 further includes a force-transfer mechanism 147 including an upper plate 148, a lower plate 150, and an intermediary plate 152, which is disposed between the upper and lower plates 148, 150 and between the upper and lower sections 140a, 142a and 140b, 142b of the front and rear straps 140, 142. The plates 148, 150, 152 are, as a unit, configured to transfer forces between the axle 106 and the chassis 14 through the front and rear straps 140, 142, as will be described.

The upper plate 148 of the force-transfer mechanism is slidably disposed within the housing structure 138 and overlaps the upper sections 140a, 142a of the front and rear straps 140, 142. The upper plate 148 has a pair of front and rear stops 148a, 148b protruding downwardly therefrom. The rear end portion 144b of the front strap 140 is wrapped about the front stop 148a of the upper plate 148, and the rear stop 148b of the upper plate 148 is disposed within the rear strap 142 adjacent the rear end portion 146b thereof. Due to the rear end portion 144b of the front strap 140 being wrapped about the front stop 148a of the upper plate 148, the upper plate 148 advances with the front strap 140 relative to the rear strap 142 during a deceleration of the vehicle 10 (FIGS. 1A-2). The lower plate 152 is configured similarly as the upper plate 148, but with respect to the lower sections 140b, 142b of the front and rear straps 140a, 140b rather than the upper sections 140a, 142a. Therefore, for the sake of brevity, details of the lower plate 148 will not be described.

The intermediary plate 152 is slidably disposed between the upper and lower plates 148a, 150 and has a first pair of front and rear stops 152a, 152b projecting upwardly therefrom, and a second pair of front and rear stops 152c, 152d projecting downwardly therefrom. The rear stops 152b, 152d of the intermediary plate 152 are received in the respective upper and lower sections 142a, 142b of the rear strap 142, whereas the front stops 152a, 152c of the intermediary plate 152 are received in the upper and lower sections 140a, 140b of the front strap 140. The rear stops 152b, 152d of the intermediary plate 152 have the front end portion 146a of the upper and lower sections 142a, 142b of the rear strap 142 wrapped thereabout. Since the front end portion 146a of the rear strap 142 is wrapped about the rear stops 152b, 152d of the intermediary plate 152 and the rear end portion 146b of the rear strap 142 is wrapped about the axle 106, the intermediary plate 152 and its stops 152a, 152b, 152c, 152d are held stationary with respect to the rear strap 142/axle 106 as the front strap 140 advances away from the rear strap 142 during a deceleration of the vehicle 10.

Further provided is a pair of front and rear dampers 160, 162 disposed within the upper sections 140a, 142a of the respective front and rear straps 140, 142. The lower sections 140b, 142 of the front and rear straps 140a, 142 may also include front and rear dampers 164, 166. The dampers 160, 162, 164, 166 may have a honey-comb structure, an accordion configuration, or the like. Such dampers may be fabricated from any suitable type of collapsible material that may permanently collapse (e.g., crumple) upon receiving a threshold force. In some embodiments, such dampers may be configured to temporarily collapse, and may include springs, shape memory material (e.g., nitinol) or the like, etc. Other types of dampers are also contemplated, such as dashpots. The upper, front damper 160 is captured between the front stop 152a of the intermediary plate 152 and the front stop 148a of the upper plate 148, and the upper, rear damper 162 is captured between the rear stop 152b of the intermediary plate 152 and the rear stop 148b of the upper plate 148.

In this way, as the front strap 140 moves with the transverse bar 16 of the chassis 14, during vehicle 12 travel and with the axle 106 fixed relative to the road surface "RS," the front strap 140 drives an advancement of the upper plate 148 relative to the intermediary plate 152 in the direction indicated by arrow "B" in FIG. 8. As the upper plate 148 advances relative to the intermediary plate 152, which is held stationary relative to the rear strap 142/axle 106, the rear damper 162 is compressed (e.g., permanently crushed) between the rear stops 148*b*, 152*b* of the upper and intermediary plates 148, 152, and the front damper 160 is compressed (e.g., permanently crushed) between the front stops 148*a*, 152*a* of the upper and intermediary plates 148*a*, 152, thereby absorbing kinetic energy to reduce the rate of vehicle 10 deceleration.

In aspects, instead of the dampers 160, 162, 164, 166 being collapsible, an expandable damper (not shown) may be provided between the first and second straps 140, 142 to couple the rear end portion 144*b* of the front strap 140 with the front end portion 146*a* of the rear strap 142. The expandable damper may stretch, such as, for example, in an accordion-like fashion, during deceleration of the vehicle 10.

As briefly mentioned above, the vehicle 10 may be equipped with various sensors for detecting the presence of an object (e.g., a pedestrian) positioned along a path of the vehicle 10. In use, upon determining that an object located along the immediate path of the vehicle 10 is one that must be avoided and cannot be avoided using the normal braking mechanism provided by the vehicle 10, the deceleration system 100 of the present disclosure may be activated. In particular, the control box 110 sends a signal to the explosives in the first and second couplers 20*a*, 20*b* of the chassis 14 to detonate the first and second couplers 20*a*, 20*b*. Upon detonating the first and second couplers 20*a*, 20*b*, the ends 106*a*, 106*b* of the axle 106 are no longer fixed to the longitudinal bars 18*a*, 18*b* of the chassis 14, thereby allowing the double torsion spring 124 of the linkage assembly 112 to forcefully drive the axle 106 and the attached powered drivers 102 out of the stored position (FIG. 1A) toward the deployed position (FIG. 1B).

Upon deploying the axle 106, the teeth 134 that extend from the body 126 of the powered drivers 102 engage the road surface "RS" to temporarily hold the powered drivers 102 and the axle 106 stationary with respect to the road surface "RS" as the chassis 14 continues to advance in the direction indicated by arrow "C" in FIG. 1B. Since the transverse bar 114 of the linkage assembly 112 is axially restrained to the longitudinal bars 18*a*, 18*b* of the chassis 14, the transverse bar 114 of the linkage assembly 112 advances with the chassis 14 relative to the axle 106 and the powered drivers 102. As the transverse bar 114 of the linkage assembly 112 advances relative to the axle 106, the arms 116, 118 of the linkage assembly 112 rotate, in the direction indicated by arrow "D" in FIG. 3, about the axis of the axle 106 and are compressed between the chassis 14 and the axle 106 from the weight of the vehicle 10. When the transverse bar 114 of the linkage assembly 112 is directly above the axle 106, the weight of the vehicle 10 acting on the arms 116, 118 is at its greatest and causes the road surface "RS" to exert a large normal force on the teeth 134 of the powered drivers 102 (relative to the road surface "RS") to fully engage the teeth 134 with the road surface "RS."

Upon the transverse bar 114 of the linkage assembly 112 moving directly over the axle 106 (i.e., the teeth 134 are engaged with the road surface "RS"), the control box 110 is configured to concurrently actuate the powered drivers 102 to propel the anchors 128 of the powered drivers 102 into the road surface "RS" to securely fix the axle 106 relative to the road surface "RS." The powered drivers 102 are actuated at this moment because the powered drivers 102 are temporarily stationary or substantially stationary relative to the road surface "RS," substantially increasing the probability that the anchors 128 will penetrate and hold onto the road surface "RS" despite the vehicle 10 moving at a high speed (e.g., about 35 mph).

After deploying the anchors 128 into the road surface "RS," the vehicle 10 does not instantaneously come to a halt due to the action of the dampers 160, 162, 164, 166. With the axle 106 now fixed relative to the road surface "RS" via the anchors 128 of the powered drivers 102, the chassis 14 of the still-moving vehicle 10 advances relative to the axle 106, thereby taking up any slack that may remain in the front and rear straps 140, 142 and/or elongating the front and rear straps 140*a*, 142 to their maximum length. With the front and rear straps 140, 142 fully extended, continued advancement of the chassis 14 relative to the axle 106 and the pulling force this exerts on the front strap 140 urges the front stop 148*a* of the upper plate 148 relative to and toward the front stop 152*a* of the intermediary plate 152 in the direction indicated by arrow "B" in FIG. 8. The rear strap 142 prevents the intermediary plate 152 from advancing with the chassis 14, the upper plate 148, and the front strap 140 because the rear strap 142 is wrapped about the rear stop 152*b* of the intermediary plate 152 at its front end portion 146*a* and wrapped about the now-fixed axle 106 at its rear end portion 146*b*.

As the upper plate 148 advances relative to the intermediary plate 152, the front damper 160 begins to compress between the front stops 148*a*, 152*a* of the upper and intermediary plates 148, 152, and the rear damper 162 begins to compress between the rear stops 148*b*, 152*b* of the upper and intermediary plates 148, 152. The compression or collapse of the front and rear dampers 160, 162 absorbs energy (e.g., the kinetic energy of the moving vehicle 10) to reduce the rate of vehicle 10 deceleration. In this way, instead of the vehicle 10 coming to an immediate stop upon deployment of the anchor 128 into the road surface "RS," the vehicle 10 stops in the amount of time it takes to travel the distance equivalent to the length of one of the dampers 160, 162, 164, 166. As can be appreciated, the rate of deceleration of the vehicle 10 by the deceleration system 100 may be adjusted by changing the length of the dampers 160, 162, 164, 166. In embodiments, the vehicle 10 may be configured to come to an immediate halt upon deploying the anchors 128. In certain embodiments, one or more anchors 128 can be deployed to cause the vehicle 10 to turn as it decelerates. For instance, one or more anchors 128 positioned on a right side of the vehicle 10 can be deployed, which may cause the vehicle 10 to turn to the right as the vehicle 10 decelerates. In certain embodiments, one or more anchors 128 can be deployed simultaneously and/or successively to effectuate turning and/or swerving of the vehicle 10 in one or more directions to help avoid objects (e.g., objects sensed by one or more sensors of the vehicle 10, and/or the presence of which is communicated to the vehicle 10).

It is contemplated that the deceleration system 100 may be employed in conjunction with (e.g., simultaneously and/or successively with) the normal braking mechanism.

In some aspects, the vehicle 10 and/or deceleration system 100 thereof may be configured to communicate with others (e.g., automatically send a notification by text message, phone call, email, etc.). For instance, vehicle 10 can send a notification to a High Patrol and/or Caltrans or any like agency. In embodiments, vehicle 10 and/or deceleration system 100 can be configured to effectuate such communication prior to, immediately after, or simultaneously with, the deployment of the anchor 128 into the road surface "RS." In some embodiments, vehicle 10 is configured to communicate with a fleet manager, customer, repair shop or base, or the like regarding a status of vehicle 10 and/or one or more components (e.g., the deceleration system 100) thereof. For instance, deployment of anchor 128 can cause the processor(s) of the vehicle 10 to send notification to fleet manager, a customer, and/or repair shop to alert them to any incidents associated with deployment of the anchor 128. The GPS coordinates of the anchor 128 and/or the GPS coordinates of the vehicle 128 may be provided in the notification, for instance to alert an emergency service (e.g., police) what the GPS coordinates of the location are so they know about the deployment event, the location, and that a pre-agreed-upon plan for fixing the road will take place. In some aspects, the anchor 128 may be equipped with a GPS tracker (not shown). In other aspects, the processor of the deceleration system 100 may send the GPS coordinates of the vehicle 10 (e.g., at the time of deployment.

Figure 10:
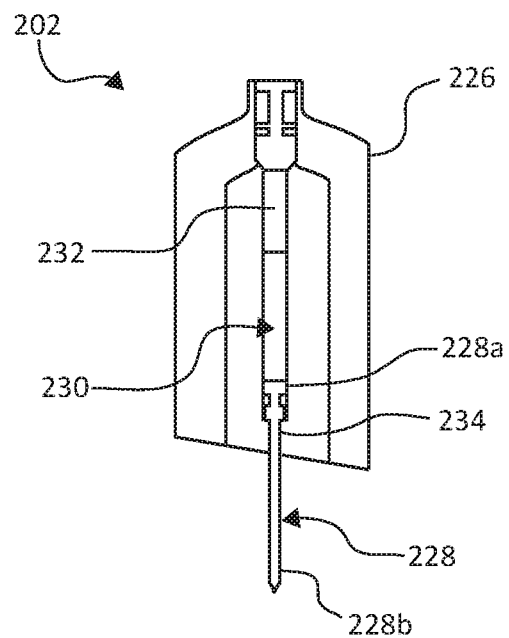
FIG. 10 is a side, cross-sectional view of another embodiment of a powered driver in accordance with the principles of the present disclosure.
Figure 11:
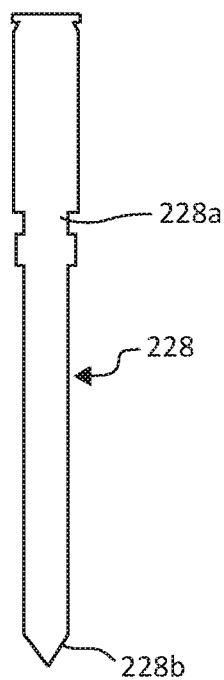
FIG. 11 is a side, cross-sectional view of an anchor seated in a casing of the powered driver shown in FIG. 10.

With reference to FIGS. 10 and 11, another embodiment of a powered driver 202, similar to powered driver 102 described above, is provided for use in the deceleration system 100. The powered driver 202 includes a body or housing 226 configured to be coupled to the axle 106 (see FIG. 3), an anchor 228, and a cartridge or casing 232. The anchor 228 is slidably disposed within a channel 230 defined in the housing 226. The anchor 228 has a proximal end 228a seated in the casing 232 when in the pre-deployed state, as shown in FIG. 11. Upon actuating the powered driver 202, for example, via igniting an explosive within the casing 232, the anchor 228 is driven out of the casing 232 and through the channel 230 until the proximal end 228a of the anchor 228 is stopped by a ledge 234 defined in the housing 226. In the deployed state, as shown in FIG. 10, the proximal end 228a of the anchor 228 sits on the ledge 234 of the housing 226 with a distal end 228b of the anchor 228 projecting out of the housing 226.

The casing 232 may be a powder-actuated casing configured to deploy the anchor 228 from the body 226 into a road surface upon receiving a signal from the processor of the control box 110 (FIG. 3). In other aspects, the casing 232 may be pneumatically-actuated, combustion-powered, or any other suitable type of actuator. The anchor 228 may be a spike having a tapered distal end 228b for penetrating a road surface.

Persons skilled in the art will understand that the structures and methods specifically described herein and shown in the accompanying figures are non-limiting exemplary embodiments, and that the description, disclosure, and figures should be construed merely as exemplary of particular embodiments. It is to be understood, therefore, that the present disclosure is not limited to the precise embodiments described, and that various other changes and modifications may be effected by one skilled in the art without departing from the scope or spirit of the disclosure. Additionally, the elements and features shown or described in connection with certain embodiments may be combined with the elements and features of certain other embodiments without departing from the scope of the present disclosure, and that such modifications and variations are also included within the scope of the present disclosure. Accordingly, the subject matter of the present disclosure is not limited by what has been particularly shown and described.

What is claimed is:

1. A system for decelerating an autonomous vehicle, comprising:
    a first transverse member configured to be coupled to, and extend substantially between, first and second longitudinal bars of a chassis of the autonomous vehicle;
    a second transverse member configured to be coupled to, and extend substantially between, the first and second longitudinal bars;
    an axle coupled to the first transverse member and the second transverse member and configured to be actuated from an undeployed state to a deployed state such that, in the undeployed state, the axle is configured to extend substantially between the first and second longitudinal bars of the chassis, opposing ends of the axle being removably attached to the first and second longitudinal bars first and second couplers, respectively, at locations overlapping an axis of the axle, the axle being disposed substantially between, and substantially parallel to, the first transverse member and the second transverse member;
    a powered driver coupled to the axle;
    an anchor supported by the powered driver; and
    a release mechanism configured to selectively actuate the axle to the deployed state by detaching the opposing ends of the axle from the first and second longitudinal bars to cause the powered driver to propel the anchor from the powered driver into a road surface, the release mechanism comprising an explosive material, which is configured to detonate the first and second couplers to detach the opposing ends of the axle from the first and second longitudinal bars,
    wherein, in the deployed state, the axle is configured to remain coupled to the first transverse member and the second transverse member, substantially between the first transverse member and the second transverse member, to maintain the anchor secured to the chassis of the autonomous vehicle when the anchor is propelled by the powered driver, to thereby secure the chassis to the road surface for decelerating the autonomous vehicle.

2. The system according to claim 1, further comprising a force transfer mechanism coupling the axle to the first transverse member, the force transfer mechanism configured to transfer force between the axle and the chassis in connection with the decelerating of the autonomous vehicle.

3. The system according to claim 2, wherein the force transfer mechanism comprises:
    a first strap coupling the force transfer mechanism to the axle; and
    a second strap coupling the force transfer mechanism to the first transverse member.

4. The system according to claim 3, wherein the first strap is wrapped about the axle, and the second strap is wrapped about the first transverse member.

5. The system according to claim 4, wherein the force transfer mechanism further comprises at least a first damper and a second damper, and
    wherein each of the first strap and the second strap comprises a closed loop, a first end portion of the first strap being wrapped about the axle while a second end portion of the first strap is wrapped about the first damper, a first end portion of the second strap being wrapped about the first transverse member while a second end portion of the second strap is wrapped about the second damper.

6. The system according to claim 5, wherein the force transfer mechanism further includes:
a first plate and a second plate, the second end portion of the first strap and the second end portion of the second strap being disposed substantially between the first plate and the second plate,
wherein each of the first damper and the second damper is captured between the first plate and the second plate.

7. The system according to claim 6, wherein the first plate is slidable relative to the second plate to cause compression of the first damper and the second damper to absorb kinetic energy associated with the decelerating of the autonomous vehicle.

8. The system according to claim 1, wherein the powered driver includes a body having a fastener protruding therefrom, the fastener configured to engage the road surface upon the anchor being propelled by the powered driver.

9. The system according to claim 1, wherein the second transverse member is configured to be pivotably coupled to the chassis and axially restrained thereto, and
wherein the system further comprises at least one telescoping member pivotably coupling the axle to the second transverse member.

10. The system according to claim 9, further comprising a biasing member configured to cause the second transverse member and the at least one telescoping member to move the axle away from the chassis, toward the road surface, upon the detaching of the opposing ends of the axle from the first and second longitudinal bars.

11. The system according to claim 1, further comprising at least another anchor, wherein the anchor and the at least another anchor are configured to be selectively propelled to effectuate turning of the autonomous vehicle in one or more directions.

12. An autonomous vehicle, comprising:
a chassis comprising first and second longitudinal bars; and
a system for decelerating the chassis along a road surface, the system including:
a first transverse member coupled to, and extending substantially between, the first and second longitudinal bars;
a second transverse member coupled to, and extending substantially between, the first and second longitudinal bars;
an axle coupled to the first transverse member and the second transverse member and configured to be actuated from an undeployed state to a deployed state such that, in the undeployed state, the axle extends substantially between the first and second longitudinal bars, opposing ends of the axle being removably attached to the first and second longitudinal bars by first and second couplers, respectively, at locations overlapping an axis of the axle, the axle being disposed substantially between, and substantially parallel to, the first transverse member and the second transverse member;
an anchor; and
a release mechanism configured to selectively actuate the axle to the deployed state by detaching the opposing ends of the axle from the first and second longitudinal bars to cause the anchor to be propelled into the road surface to fix the anchor in the road surface, the release mechanism comprising an explosive material, which is configured to detonate the first and second couplers to detach the opposing ends of the axle from the first and second longitudinal bars,
wherein, in the deployed state, the axle remains coupled to the first transverse member and the second transverse member, substantially between the first transverse member and the second transverse member, to maintain the anchor secured to the chassis when the anchor is propelled and thereby secure the chassis to the road surface for decelerating the autonomous vehicle.

13. The autonomous vehicle according to claim 12, wherein the system for decelerating the chassis further comprises:
a first damper and a second damper;
a first strap comprising a first closed loop having a first end portion wrapped about the axle and a second end portion wrapped about the first damper; and
a second strap comprising a second closed loop having a first end portion wrapped about the first transverse member and a second end portion wrapped about the second damper.

14. The autonomous vehicle according to claim 12, wherein the system for decelerating the chassis further comprises a powered driver coupled to the axle and including:
a body supporting the anchor therein and configured to deploy the anchor therefrom; and
a tooth protruding from the body, the tooth configured to engage the road surface upon the opposing ends of the axle detaching from the first and second longitudinal bars.

15. The autonomous vehicle according to claim 12, wherein the system for decelerating the chassis further comprises at least another anchor, wherein the anchor and the at least another anchor are configured to be selectively propelled to effectuate turning of the autonomous vehicle in one or more directions.

16. The autonomous vehicle according to claim 12, wherein the system for decelerating the chassis further comprises a force transfer mechanism coupling the axle to the first transverse member, the force transfer mechanism configured to transfer force between the axle and the chassis in connection with the decelerating of the autonomous vehicle.

17. The autonomous vehicle according to claim 13, wherein the system for decelerating the chassis further comprises:
a first plate and a second plate, the second end portion of the first strap and the second end portion of the second strap being disposed substantially between the first plate and the second plate,
wherein each of the first damper and the second damper is captured between the first plate and the second plate.

18. The autonomous vehicle according to claim 12, wherein the system for decelerating the chassis further comprises:
at least one telescoping member pivotably coupling the axle to the second transverse member; and
a biasing member configured to cause the second transverse member and the at least one telescoping member to move the axle away from the chassis, toward the road surface, upon the detaching of the opposing ends of the axle from the first and second longitudinal bars.

19. A method for rapidly decelerating a moving autonomous vehicle, the method comprising:
actuating an axle of a deceleration system of the moving autonomous vehicle from an undeployed position to a deployed position by detaching opposing ends of the axle from first and second longitudinal bars of a chassis of the moving autonomous vehicle, the axle being coupled to a first transverse member and a second transverse member, each of the first transverse member and the second transverse member extending substantially between the first and second longitudinal bars, wherein, in the undeployed position, the opposing ends of the axle are removably attached to the first and second longitudinal bars by first and second couplers, respectively, at locations overlapping an axis of the axle, and the axle is disposed substantially between, and substantially parallel to, the first transverse member and the second transverse member, actuating the axle from the undeployed position to the deployed position comprising detonating the first and second couplers to detach the opposing ends of the axle from the first and second longitudinal bars;

engaging the deceleration system with a road surface as the axle moves relative to the chassis from the undeployed position to the deployed position; and deploying an anchor of the deceleration system into the road surface when the deceleration system is engaged with the road surface, wherein, in the deployed position, the axle remains coupled to the first transverse member and the second transverse member, substantially between the first transverse member and the second transverse member, to maintain the anchor secured to the chassis of the moving autonomous vehicle when the anchor is deployed, to thereby secure the chassis to the road surface for decelerating the moving autonomous vehicle relative to the road surface.

20. The method according to claim 19, further comprising elongating at least a first strap and a second strap after the anchor is deployed to absorb kinetic energy associated with the decelerating of the moving autonomous vehicle, the first strap having a first end portion wrapped about the axle and a second end portion wrapped about a first damper, the second strap having a first end portion wrapped about the first transverse member and a second end portion wrapped about a second damper.

21. The method according to claim 20, further comprising collapsing at least one of the first damper and the second damper to reduce a rate of deceleration of the moving autonomous vehicle.

22. The method according to claim 19, wherein deploying the anchor comprises deploying at least one of a plurality of anchors of the deceleration system to effectuate turning of the moving autonomous vehicle in one or more directions.

23. The method according to claim 19, wherein actuating the axle from the undeployed position to the deployed position further comprises causing, by a biasing member of the deceleration system, the second transverse member and at least one telescoping member pivotably coupling the axle to the second transverse member to move the axle away from the chassis, toward the road surface, upon the detaching of the opposing ends of the axle from the first and second longitudinal bars.

* * * * *